United States Patent [19]

Sherif et al.

[11] 3,911,093

[45] Oct. 7, 1975

[54] RECOVERY OF SO₂ FROM WASTE GAS EMISSIONS

[75] Inventors: Fawzy G. Sherif, Spring Valley, N.Y.; John S. Hayford; Julian E. Blanch, both of Stamford, Conn.

[73] Assignee: Stauffer Chemical Company, Westport, Conn.

[22] Filed: Oct. 5, 1972

[21] Appl. No.: 295,324

Related U.S. Application Data

[63] Continuation-in-part of Ser. No. 190,000, Oct. 18, 1971.

[52] U.S. Cl. ............... 423/574; 423/242; 423/223
[51] Int. Cl. ............................................. C01b 17/00
[58] Field of Search ........... 423/242, 223, 574, 192, 423/243

[56] References Cited
UNITED STATES PATENTS

| | | | |
|---|---|---|---|
| 1,995,545 | 3/1935 | Leahy | 423/242 |
| 2,534,063 | 12/1950 | Ross et al. | 423/574 |
| 2,729,543 | 1/1956 | Keller | 423/242 |
| 2,747,962 | 5/1956 | Heitz et al. | 423/242 |
| 2,816,820 | 12/1957 | Penert | 423/193 |
| 3,257,176 | 6/1966 | Nakai | 423/193 |

FOREIGN PATENTS OR APPLICATIONS

| | | | |
|---|---|---|---|
| 1,140,022 | 1/1969 | United Kingdom | |
| 17,119 | 4/1934 | Australia | |
| 1,143,847 | 2/1969 | United Kingdom | 423/242 |

*Primary Examiner*—Oscar R. Vertiz
*Assistant Examiner*—Gregory A. Heller

[57] ABSTRACT

A process for recovering sulfur values from gas emissions by absorbing SO₂ in an aqueous solution comprising a mixture of Na₂HPO₄ and NaH₂PO₄ at a pH between about 2.5 and about 5 at an absorption temperature between about 85° and about 200° F., treating the phosphate solution containing absorbed SO₂ with H₂S to produce sulfur, separating the sulfur from the phosphate solution and recycling the phosphate solution to the absorber. Provision is made to remove sulfate, which builds up in phosphate absorbent, by crystallizing sulfate from a purge stream. The process is particularly useful in the field of pollution abatement for recovering SO₂ from the off-gas obtained from a Claus-type reactor system.

14 Claims, 1 Drawing Figure

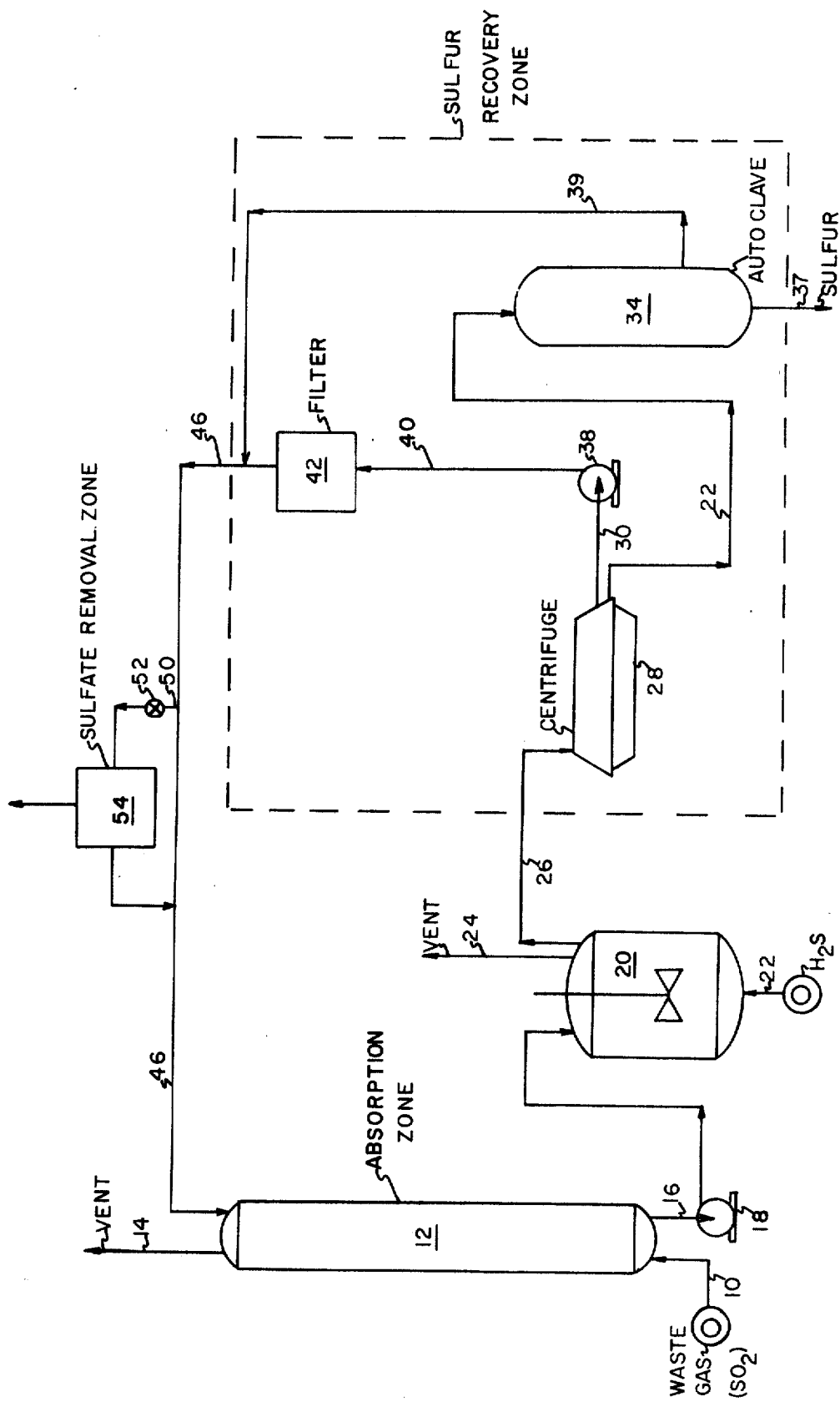

RECOVERY OF SO₂ FROM WASTE GAS EMISSIONS

CROSS-REFERENCE TO RELATED APPLICATION

This application is a continuation-in-part of application Ser. No. 190,000, filed Oct. 18, 1971.

BACKGROUND OF THE INVENTION

Sulfur containing gases such as $SO_2$ are presently discharged to the atmosphere at varying concentrations in the gaseous emissions discharged from power plants, petroleum refineries and chemical process installations. The gases containing $SO_2$ become atmospheric pollutants and may be tolerated only when extensively diluted such that the ground concentrations remain tolerable. For example, the sulfur containing process gases leaving a Claus-type reactor at temperatures of about 300° F. are usually discharged to the atmosphere after incineration which converts the sulfur compounds chiefly to $SO_2$ and raises the temperature sufficiently high so as to create a natural up-draft. The gaseous material then rises to a sufficient elevation in the atmosphere so as to dissipate and undergo dilution before returning to the ground. While this procedure creates atmospheric pollution, the degree of obnoxiousness at ground level is abated to a large extent by such procedure.

While the concentration of $SO_2$ in most industrial emissions is extremely low, the great number of processes discharging such materials and the high volume of gaseous material discharged in this manner have made $SO_2$ pollution become a very substantial problem. As a consequence, many concerned private industrial organizations have delved into the complexities of the $SO_2$ pollution problem in an attempt to develop processes which will handle the various types of emissions and will result in a manyfold reduction of the sulfur values discharged into the atmosphere. The problem is extremely complex since many otherwise viable processes merely convert the gaseous pollutants into liquid form and thus transfer the problem from one of air to water pollution. The economics of the matter must also be considered since the research, development, installation and operation of the pollution abatement equipment must be effected in a manner such that the cost of power, petroleum products and basic chemicals can remain within the reach of the ordinary consumer.

A number of processes have been proposed for the purpose of reducing $SO_2$ emissions. One such process is described in South African patent specification 69/1641. In accordance with this process, sulfur dioxide in waste gas is reacted with sodium sulfite is aqueous solutions to form an aqueous solution of sodium sulfite and sodium bisulfite thereby reducing the sulfur dioxide content of the gas. Sodium sulfite is then separated by crystallization and recovered. The sodium bisulfite solution is heated to produce sodium sulfite and sulfur dioxide. The sulfur dioxide is then either drawn off, cooled and compressed to provide a liquid product or sent as a gas to a sulfuric acid plant.

Another process described in German patent publication No. 2,001,284 relates to the treatment of waste gases from a sulfur recovery plant. This process is characterized by bringing waste gas in contact with an aqueous solution of an absorbent in an absorber reactor. In the absorber reactor the water acts as the main catalyst for the reaction of $H_2S$ and $SO_2$ to sulfur. A first solution is formed by reacting $H_2S$ and absorbent, then the absorbent containing $SO_2$ is reacted to form a second solution. Finally, the first and second solutions are reacted to regenerate the absorbent and to release sulfur such that a slurry is formed. The slurry is subjected to heating and melting to separate the sulfur and the absorbent is recycled to the absorber reactor. This German publication teaches the use of conventional absorbents for $H_2S$ in the process. Examples of the absorbents include $K_3PO_4$, $K_2CO_3$, $Na_3PO_4$ as well as methyl, diethyl, and triethyl amines. Each of these $H_2S$ absorbents is a highly alkaline material resulting in a high pH in the absorption zone, and the use of $K_3PO_4$, for example, may result in the formation of colloidal sulfur.

Another process is described in a paper entitled "Removal of $SO_2$ in Production of Sulfur from Smelter Gases," George et al, presented at the Mining Society, AIME, Fall Meeting, Salt Lake City, Utah, Sept. 17–19, 1969. This process involves the absorption of $SO_2$ in an aqueous citrate solution followed by reaction of $SO_2$ laden material with $H_2S$ to form a filterable sulfur. The absorbent is recycled. The paper points out that the chemistry of the process while apparently simple is extremely complicated.

U.S. Pat. No. 2,031,802 describes a process wherein solutions of monobasic phosphates and sodium citrate are disclosed as suitable solutions for absorption of $SO_2$. The $SO_2$ laden solution is regenerated by heating it to its boiling point to drive off the $SO_2$. U.S. Pat. No. 2,368,595 shows the use of tripotassium phosphate, a highly alkaline material, as an absorbent for $SO_2$ and $H_2S$ followed by stripping of the $SO_2$ and $H_2S$ from the absorption media. U.S. Pat. No. 2,563,437 shows absorbing $SO_2$ in $Al_2(SO_4)_3$ and $H_2SO_4$ and then reacting the solution with $H_2S$ to produce filterable sulfur, separating the sulfur, and recycling the supernatent liquid. U.S. Pat. No. 2,729,543 discloses the absorption of $SO_2$ by salts of acids which can be buffered in the 4 to 6 pH range specifically citing citric acid. The solution containing dissolved $SO_2$ is contacted with $H_2S$ to precipitate sulfur.

While numerous processes are described in the prior art, each has one or more disadvantages when applied to a specific problem. These disadvantages include (a) loss of absorbent from the system, e.g., by volatilization, absorption on the sulfur product, or decomposition; (b) difficulty of separating $SO_2$ from the absorbent medium; (c) failure to produce a satisfactory sulfur product for reuse in a captive process or for resale on the market; (d) production of undesirable waste materials which cause a further pollution problem. Each of these disadvantages results in exceptionally high capital and operating costs making installation of the abatement process wholly impractical.

The principle object of the present invention is to provide a process for reducing $SO_2$ emission in stack gases far below the present level in an economically practicable manner and without causing further pollution problems.

BRIEF DESCRIPTION OF THE INVENTION

The objects of the present invention are generally accomplished in accordance with the process of the present invention by absorbing $SO_2$ in a gaseous emission in an aqueous solution containing an alkali metal phosphate at a pH between about 2.5 and about 5, introducing gaseous $H_2S$ into the $SO_2$ laden phosphate solution to produce sulfur, separating the elemental sulfur from the aqueous phosphate solution, and recycling the phosphate solution to a suitable absorption zone to absorb more $SO_2$.

In general, the absorbent is an aqueous solution of an alkali metal phosphate which provides a pH of the absorbent liquor (during steady state operation of the $SO_2$ absorption and the $SO_2$ reaction zones) generally between about 2.5 and about 5, and, preferably, between about 2.8 and about 4.5. For this purpose, a pH greater than about 5 is unsatisfactory primarily because its results in the formation of colloidal sulfur. A pH below about 2.5 is unsatisfactory because $SO_2$ absorption is inefficient.

During steady state operation of the process, the pH of the absorbent decreases as $SO_2$ is absorbed in the solution and increases as the solution is contacted with $H_2S$ and elemental sulfur formed. In general, the pH of the solution entering the absorber is between about 3.5 to about 5 and the pH of the solution leaving the absorber is about 2.5 to about 3.5. The pH is primarily dependent upon the alkali metal:P ratio, the concentrations of active species in the solution and the amount of $SO_2$ in the solution.

The absorbent solution contains a molar ratio of alkali metal:P of between about 2.5:1 to about 1:1. During operation of the process the absorbent solution developes concentration of sulfur containing species such as $HSO_3^-$, $S_2O_3^{--}$, $S_xO_6^{--}$ Ia polythionate wherein X is between 3 and about 6) and $SO_4^{--}$. The $HSO_3$, $S_2O_3^{--}$ and $S_xO_6^{--}$ concentration in the absorbent are active species and are characteristic of the process parameters such as concentration of $SO_2$ in the absorbent, $PO^{---}$ concentration and ratio of alkali metal:P. The $SO_4^{--}$ concentration can arise from many sources and is not characteristic of any absorbent composition or operating parameter. The alkali metal:P ratio is a molar ratio. The ratio is determined from the alkali metal associated with the active species with the exclusion of alkali metal associated with sulfate or other inactive species in the absorbent. The alkali metal:P ratio is determined by determining the total alkali metal content of the solution and deducting the amount of alkali metal required to neutralize the sulfate, chloride or other inactive species in the solution.

Salts which are suitable for preparing absorbent solutions for use in the present invention include the alkali metal acid phosphate salts, and mixtures thereof, preferably those having an alkali metal:P ratio between about 2.5:1 and about 1:1, e.g., reaction products of orthophosphoric acid and basic salts of alkali metals, $Na_2HPO_4$, $NaH_2PO_4$ and mixtures thereof. Other suitable salts include potassium acid phosphates, lithium, rubidium and cesium phosphates, sodium fluorophosphate, sodium thiophosphate as well as combinations thereof. A mixture of phosphoric acid and above named salts is also suitable.

The term "alkali metal phosphate" as employed herein is intended to encompass not only the orthophosphates which are conventionally designated as "phosphates" but also derivative salts such as the fluorophosphates and thiophosphates mentioned above. In addition, the term "alkali metal phosphate" encompasses the alkali metal pyrophosphates, which under the conditions of pH wherein the present process is operated, will rapidly decompose to form orthophosphates. This term also encompasses the use of polyphosphates, e.g., sodium tripolyphosphates which will degrade over a period of time to orthophosphates under the pH conditions of the present process.

The terms $PO_4^{---}$, P, or phosphate is used herein to refer to the inorganic phosphate dissolved in the absorbent.

The concentration of $PO_4^{---}$ (phosphate) in the absorbent is critical to the process and determines the ratio of alkali metal:P useful in the absorbent. When the molar concentration of $PO_4^{---}$ is low, that is, below about 1.50 molar the absorbent can be effective up to molar ratios of alkali metal:P of about 2.5:1. At $PO_4^{---}$ concentration above about 1.50 molar the alkali metal:P ratio must be reduced to maintain the effectiveness of the absorbent. A 1.5 molar $PO_4^{---}$ absorbent having an alkali metal:P ratio of 1.5 and 1.25 molar $PO_4^{---}$ absorbent having an alkali metal:P ratio of 2.0 are effective absorbents. By proper selection of $PO_4^{---}$ concentration and alkali metal:P ratio it is possible to operate the process within broad limits. The preferred range of absorbent composition fall within the range of between about 0.25 to about 1.25 molar $PO_4^{---}$ at an alkali metal:P ratio of about 2.5 to about an 0.5 to about 2.0 molar $PO_4^{---}$ at an alkali metal:P ratio of about 1. High concentrations of alkali metal and phosphate in the absorbent increases the solution viscosity and amounts of active species in that solvent. It can be difficult to contact the viscous solution with the $SO_2$ bearing gas or to contact the solution containing $SO_2$ with $H_2S$ to obtain a rapid reaction. High concentrations of alkali metal and phosphate are not suitable for low temperature absorption since the salts tend to crystallize out of the solution. When the concentration of $PO_4^{---}$ is below the above limits the $SO_2$ absorption is low. When the concentration of $PO_4^{---}$ is high at the higher alkali metal:P ratios the amounts of active species in the absorbent liquor increases and can present problems in operation of the process.

The process of the present invention is capable of reducing the $SO_2$ content of a wide range of gaseous process emissions from between 0.1–15% down to 10–50 PPM thereby substantially eliminating $SO_2$ as an obnoxious pollutant.

REFERENCE TO DRAWINGS

Reference is made to the FIGURE of the drawing which illustrates diagrammatically, in elevation, one preferred embodiment of the process of the present invention.

DETAILED DESCRIPTION OF THE INVENTION

Reference is made to the FIGURE of the drawing for purposes of the detailed description of the invention. Waste gas from a Claus -type reactor is oxidized to convert sulfur containing gases to $SO_2$ thereby substantially eliminating the presence of COS, $CS_2$, $H_2S$ and $S_x$ (vapor) from such gas. Thermal, thermal catalytic or catalytic oxidation is effective. If the gas is not oxidized a portion of the COS, $CS_2$, $H_2S$ and $S_x$ (vapor) will pass through the absorption zone to become atmospheric pollutants. This oxidized gas can be cooled if required by conventional means such as waste heat boilers, direct quench with aqueous medium or air or water cooled heat exchangers. If necessary, the gas may be compressed to move it through the processing equipment. The oxidized gas is introduced via line 10 into absorption zone 12. In the absorption zone the waste gas is contacted with an aqueous solution containing an alkali metal phosphate to absorb $SO_2$. The pH of the solution is generally maintained between about 2.5 and about 5 and preferably between about 2.8 and about 4.5. The pH of the phosphate solution introduced into the absorption zone is usually near the upper part of the 2.5-5 pH range and is gradually lowered as the solution absorbs $SO_2$.

The reaction which takes place in the absorption zone when $Na_2HPO_4$ is the alkali metal salt may be represented by the following equation:

$$Na_2HPO_4 + SO_2 + H_2O \rightarrow NaHSO_3 + NaH_2PO_4$$

In general, any suitable absorption method and means can be employed in carrying out the process of the present invention. One preferred method involves the use of an absorption column containing suitable packing designed to afford adequate countercurrent contact between the gas and liquid components.

The absorption temperature is maintained between about ambient and about 200° F. Lower operating temperatures within the above stated range favor more efficient absorption of $SO_2$ in the absorption zone and higher concentration of $SO_2$ in the absorbent. However, since the gases containing $SO_2$ are often obtained at elevated temperatures, and since complete cooling of such gases is not always economically practicable, an economic balance must be struck between the loss of efficiency in absorption as the temperature is raised in the absorption zone and the cost of cooling the gases. It has been found in the practice of the present invention that the absorption zone can be operated satisfactorily at a temperature as high as about 200° F. For example, when the waste gas effluent from a Claus-type reactor is incinerated and subjected to a simple adiabatic water quench and then introduced into the absorption zone of the present invention, the temperature in the absorption zone can be maintained between about 150° F. and about 170° F. at which satisfactory absorption is obtained. It is preferred that the absorption step be carried out at a temperature near the dew point of the gas stream so that the amount of water in the system can be easily controlled.

Under certain circumstances, the presence and build-up of sulfate ion ($SO_4^{--}$) may present a problem, in the operation of the process by reducing absorption efficiency. As previously stated, the preferred molar alkali metal:P ratio is between 2.5:1 and 1:1, most preferably 1.5:1. The alkali metal:P ratio is based on the amount of alkali metal present in the absorbent less the amount which is associated with the sulfate ion (2 mols alkali metal per mol $SO_4^{--}$) and any other inert species in the absorbent. As the concentration of sulfate ion in the absorbent increases the pH is lowered, thus affecting the ability of the absorbent to remove $SO_2$ from the gas stream. If additional alkali metal hydroxide, carbonate or other basic salt is added to the absorbent to bring the pH to the desired level, the absorbent can contain large amounts of sulfate ion without large adverse effect on the $SO_2$ absorption capacity of the absorbent. The absorption efficiency of solutions containing 100 grams per liter sulfate ion is not greatly different than a solution containing 25 grams per liter sulfate ion as long as the pH of the solutions are the same. Operation of the process with an absorbent containing between about 25 and about 100 grams per liter sulfate ion concentration can be readily accomplished. The sulfate can be readily removed by cooling the absorbent and crystallizing a portion of the sulfate ion from the solution.

The recycle liquor passed to the absorber in line 46 may contain from 0 to 1 g. of $SO_2$ per liter in the form of $HSO_3^-$ as well as varying concentrations of thiosulfate, sulfate and polythionate. It is preferred that the concentration of $SO_2$ in the absorbent feed to the absorption column be below about 0.2 gram per liter. Levels of $SO_2$ below about 0.2 grams per liter can provide gas streams containing less than 100 ppm $SO_2$. As the amount of $SO_2$ in the absorbent feed to the absorber increases, the amount of $SO_2$ in the gas leaving the absorber increases. Low levels of $SO_2$ in the gas stream leaving the absorption zone are achieved by maintaining low levels of $SO_2$ in the absorbent entering a countercurrent absorption zone.

The present invention is generally useful for handling a wide range of gaseous emissions containing from about 0.1 to 15 percent $SO_2$ including but not limited to gaseous emissions from sulfuric acid plants, paper mills, power plants, smelter operations as well as Claus units (incinerated as well as non-incinerated), and the like. Under normal operating conditions a Claus-type reactor emission contains up to about 1.2% $SO_2$. Under these conditions the present process readily reduces the $SO_2$ content of the vent gas in line 14 below 50 parts per million (ppm), or, if desired, even below 25 parts per million. The $SO_2$ content of the vent gas in line 10 is determined by the amount of $SO_2$ in the absorbent solution entering the absorption zone, and the factors considered in design of the absorber such as contact between liquid and gas, ratio of liquid to gas flow and other physical parameters which are well known in the art.

Absorbent containing $SO_2$ is withdrawn from a lower portion of the absorption zone in line 16 and passed by means of pump 18 into reactor 20, a gas liquid contactor which can be a stirred tank reactor, sparged column or other gas liquid contacting devices. In the reaction zone the $SO_2$ laden phosphate solution is contacted with gaseous $H_2S$ introduced via line 22. Where the phosphate absorption system described herein is employed in conjunction with a Claus unit, a common source of $H_2S$ may be used for both systems. The reaction which takes placed in reaction zone 20 may be represented as follows:

$$NaHSO_3 + 2H_2S + NaH_2PO_4 \rightarrow Na_2HPO_4 + 3S + 3H_2O$$

Side reactions which may take place may be represented as follows:

$$6Na_2S_2O_3 + 9SO_2 \rightarrow 4Na_2S_3O_6 + Na_2S_4O_6 + Na_2S_5O_6$$

$$2NaHSO_3 + S \rightarrow Na_2S_2O_3 + SO_2 + H_2O$$

Since an amount of $H_2S$ in excess of the stoichiometric amount necessary to react with the $SO_2$ is usually provided, the gas in vent 24 comprises $H_2S$ saturated with water. If the system is being employed with a Claus unit it is preferable to vent the saturated $H_2S$ to the Claus unit. The additional water has negligible effect on the overall efficiency of the sulfur recovery operation. If the system is being used independently of a Claus unit it may be desirable to recycle the $H_2S$ to line 22 by means of a compressor.

Any suitable method and means for contacting the $H_2S$ with the absorbent may be employed in reactor 20.

Since sulfur is formed in the reactor, it may be preferable to avoid baffling the reactor in order to prevent solids build-up.

The rate of feed of $H_2S$ to reactor 20, $H_2S$ contact with the absorbent and residence time should be controlled to insure reaction of a substantial portion of the $SO_2$ in the liquor recycled to absorber 12. Where $H_2S$ feed rate is too low, contact is inadequate or residence time is inadequate, the recycle liquor will become rich in sulfur containing species such as polythionates, thiosulfate and $SO_2$ thereby reducing absorption efficiency. The $H_2S$ feed rate to the reactor should be maintained preferably between about stoichiometric and about 500 percent excess over the amount required to react the $SO_2$ to sulfur and most preferably between about 5 and about 200% excess over the stoichiometric amount necessary to react the $SO_2$ to sulfur. The solubility of $H_2S$ in the absorbent is low so that large excesses of $H_2S$ are advantageous for achieving rapid reaction between $H_2S$ and the $SO_2$ in the absorbent. The residence time in the reactor will vary widely depending upon design factors, however, a residence time between about 1 and 20 minutes for the $SO_2$ laden absorbent is usually satisfactory. Residence times longer than 20 minutes are not harmful to the process and tend to produce sulfur having a larger particle size.

In the system described by reference to the drawing, the temperature of reaction zone 20 is preferably maintained between about 100° F. and about 180° F., however, temperatures in the range of 90° F. to 200° F. insure rapid reaction of the absorbent with the $H_2S$. Elevated temperatures are not harmful to the reaction.

As previously indicated, the pH of the phosphate absorbent is maintained between about 2.5 and about 5 to produce readily filterable sulfur during the introduction of $H_2S$ into the $SO_2$ laden phosphate solution. The pH of the phosphate absorbent introduced to the reaction zone is usually within the lower part of the 2.5–5 pH range since it is rich in $SO_2$. The treatment with $H_2S$ elevates the pH to the upper part of the 2.5–5 pH range where it is suitable for reintroduction to the absorption zone.

Under the conditions employed in the reaction zone, readily filterable sulfur is obtained in a slurry which is passed via line 26 to suitable sulfur recovery zone. In the drawing, sulfur recovery is shown as including centrifuge 28, filter 42 autoclave 34. However, any suitable method and means for recovering sulfur from the alkali metal phosphate can be employed in conjunction with the present invention. For example, sulfur can be separated by decantation or flotation techniques known in the art.

In one alternative embodiment, reactor 20 can be operated under autoclave conditions to produce and separate molten sulfur from resulting phosphate liquor. The reaction-autoclave temperature is between about 275° and about 300° F. and pressure is between about 45 and about 70 psig.

Another alternative embodiment involves heating the slurry from the reactor 20 to the melting point of sulfur in a conventional shell and tube heat exchanger at the autogenous pressure. The molten sulfur is separated from the phosphate by density difference in a phase separator.

Referring again to the drawing, the slurry in line 26 is separated in centrifuge 28. A stream containing sulfur and liquor is withdrawn in line 22 and passed through autoclave 34. The autoclave is operated at temperature between about 270° F. and about 300° F. The sulfur concentration of the slurry fed to the autoclave will vary between 10 and 50% sulfur. The sulfur product is withdrawn from the autoclave in line 37. The liquid from the autoclave is passed via line 39 to be mixed with the main stream of liquor in line 46. Preferably, the liquid is cooled in a suitable heat exchange zone prior to mixing in line 46.

The phosphate containing liquor is withdrawn from the centrifuge in line 30, passed through pump 38 and line 40 to clean-up filter 42 wherein residual sulfur is removed therefrom. The loss of phosphate absorbent in the sulfur separation zone is negligible and therefore no provision is made for adding make-up absorbent on a regular basis. The absorbent in line 46 can then be recycled directly to absorption zone 12.

Since sulfate appears to build up in the system during steady state operation, provision may be made for removing sulfate from the recycle liquor. Under certain circumstances this can be achieved simply by purging a small portion of the phosphate stream and adding make-up material as required. However, the purging of liquid waste containing sulfates and phosphates is considered as obnoxious under most conditions and therefore, in conjunction with the present invention, it is highly desirable to employ suitable sulfate removal equipment which enables recycling a substantial portion of the phosphate absorbent. In accordance with one preferred embodiment of the present invention, a purge stream is withdrawn in line 50 through valve 52 and passed to the sulfate removal zone 54. In this zone, the liquor is cooled in one or more stages to between about 32° F. and about 50° F. where most of the sulfate crystallizes out as Glauber's salt ($Na_2SO_4.10H_2O$) together with very small amounts of phosphate. The precise temperature which is required depends upon the concentration of sulfate present. Additionally, control of the pH of the liquor prior to cooling can improve sulfate separation. The phosphate liquor freed of most of the sulfate is then recycled. The sulfate can also be separated by chemical precipitation, e.g., by adding barium salts or lime and filtering the insoluble sulfate.

Having thus described the invention in general terms, now reference is made to specific examples thereof.

EXAMPLE 1

This example illustrates the pH range required for the $SO_2$—$H_2S$ interaction in phosphate solutions to form filterable sulfur. The following solutions are prepared: 3 molar $Na_2HPO_4$, 2 molar $Na_2HPO_4$, 2 molar $Na_2HPO_4$/1 molar $NaH_2PO_4$, 1 molar $Na_2HPO_4$, 1 molar $Na_2HPO_4$/1 molar $NaH_2PO_4$ and 0.5 molar $Na_2HPO_4$/0.5 molar $NaH_2PO_4$. Fifty ml. of a solution 2 molar $Na_2HPO_4$/1 molar $NaH_2PO_4$ having an initial pH of 6.8 is treated with a gas containing 1.5% $SO_2$. When the amount of $SO_2$ absorbed by the solution reaches 100 g. $SO_2$/l, the pH drops gradually to 4.6. $H_2S$ is then introduced and filterable sulfur is formed. The pH further drops to 3.6. The sulfur is removed by filtration and the filtrate is treated with $SO_2$ until the pH is 3.3. $H_2S$ is then introduced and the pH increases to 4.6 and more sulfur is formed. Continuous and alternate treatment with $SO_2$ and $H_2S$ forms filterable sulfur as long as the pH of the $SO_2$ treated solution is between about 2.5–3.4 and the $H_2S$ treated solution is between 3.8–4.8.

When $H_2S$ is passed into any of the above solutions at a pH greater than about 5 but less than about 7, colloidal sulfur forms. At a pH higher than about 7 no sulfur is formed.

For the purpose of observing a phosphate absorbent under a variety of mixing conditions. A tripotassium phosphate solution which is 0.5 molar is treated with a gaseous mixture containing about 1% by volume $SO_2$ and about 2% by volume $H_2S$. The pH of the solution drops from about 12 to about 6. No sulfur forms.

However, a similar fresh solution is saturated, separately, with $H_2S$ until the pH is about 8; and a second fresh solution is saturated also separately with $SO_2$ until the pH is about 3. Thereafter, the first solution is mixed with the second. Filterable sulfur forms when there is a volumetric excess of the saturated $SO_2$ solution and the final pH of the mixture is less than or equal to about 5. If a slight volumetric excess of the saturated $H_2S$ solution is mixed with the $SO_2$ solution, colloidal sulfur forms. If large excess volume of the saturated $H_2S$ solution is used in comparison to the volume of the $SO_2$ saturated solution, the pH of the final mixture is greater than about 7 and no sulfur forms.

EXAMPLE 2

Ten liters of a solution 0.5 molar $Na_2HPO_4$/0.5 molar $NaH_2PO_4$ prepared by dissolving 600 grams sodium hydroxide and 1,150 grams syrupy phosphoric acid in water, is treated with a gas containing 1.5% by volume $SO_2$ until the pH dropped from 6.3 to about 4. The solution at this point contains 28–30 grams per liter $SO_2$. It is pumped into a reactor which consists of a five liter three neck flask equipped with an agitator and a heating mantle. Gaseous $H_2S$ is introduced to the bottom of the reactor through a fritted glass disc. The sulfur formed in the reactor flows downwardly to a settling flask where large sulfur particles are formed. The principle liquid stream flows downwardly to a Buchner funnel where it is filtered into a suction flask and the solid sulfur is collected on filter paper. The clear solution is passed to a surge tank, a five liter round bottom flask heated by a mantle. The solution is then pumped to the top of the absorber. The absorber comprises a two-inch (inside diameter) insulated glass column. The absorption zone consists of eighteen inches of ¼ inch Intalox ceramic saddles. The $SO_2$ rich solution is then passed to the reactor where $H_2S$ is reacted with the solution, sulfur is formed and separated from the absorbing solution which is circulated to the absorber. The conditions of this example are summarized as follows:

| | |
|---|---|
| Temperature | = 113° F. |
| $N_2$ Feed rate | = 1.7 SCFM |
| $SO_2$ Feed rate | = 0.026 SCFM |
| $H_2S$ Feed rate | = 0.104 SCFM, residence time about 10 min. |
| Liquid flow rate | = 340 ml/min. |
| Salt concentration | = 1.5 molar Na $^+$/1 molar $PO_4^{---}$ |

After a five hour recycle the percentage absorption of $SO_2$ in the absorber is 81%. The liquor leaving the absorber contains about 5.5 grams per liter $SO_2$. After sulfur removal with $H_2S$ in the reactor it contains less than about 0.2 grams per liter $SO_2$. The thiosulfate concentration through the cycle leveled at about 14 grams per liter (as $SO_2$) and the polythionates at about 1 gram per liter. The sulfate concentration is about 2 grams per liter. The sulfur product is yellow.

EXAMPLES 3–6

A series of runs are made employing the system described in Example 2 in which the temperature of the circulating liquor is varied in order to study the effect of this parameter on absorption efficiency, thiosulfate and sulfate concentrations and upon the quality of sulfur. The reaction conditions are identical to those employed in the preceding example. The results are reported in Table 1.

TABLE 1

| Ex. No. | Temp. °F. | % Absorption of $SO_2$ | Liquid Loading $SO_2$g/l | Thiosulfate Level $SO_2$g/l | Sulfate Level $SO_2$g/l |
|---|---|---|---|---|---|
| 3 | 149 | 71 | 4.6 | 17 | 3 |
| 4 | 165 | 68 | 5.5 | 20 | 3 |
| 5 | 185 | 63 | 3.1 | 20 | 9 |
| 6* | 165 | 70 | 6.4 | 18 | 5.5 |

*This run is made similar to example 4 but with a gas feed containing 3% $O_2$.

This data shows that this process permits substantial variation in the temperature of the feed gas. In all examples the sulfur quality is satisfactory.

EXAMPLES 7 and 8

In another set of runs, we observe the effect of concentration of the sodium ion at a constant $Na^+:PO_4^{---}$ ratio of 1.5:1.0 in the solution. The conditions of Example 2 are employed. The results are given in Table 2.

TABLE 2

| Ex. No. | Temp. °F. | Concentration of $Na^+$ | % Absorption of $SO_2$ | Liquid Loading $SO_2$ g/l | Thiosulfate level $SO_2$ g/l | $SO_4$ g/l |
|---|---|---|---|---|---|---|
| 7 | 175 | 0.75 M | 67 | 3.8 | 9 | 0.95 |
| 8 | 113 | 3 M | 76 | 3.5 | 35 | 12 |

These results show that the process is operable under a range concentration of sodium phosphate solutions. It is understood that optimum conditions of temperature and concentrations should be used to get maximum absorbence with minimum sulfate buildup.

EXAMPLE 9

In this example, the conditions are identical to those used in Example 2. However, the phosphate used herein is a sodium fluorophosphate prepared from sodium hydroxide and phosphorofluoridic acid. The results are similar to those obtained in Example 2.

EXAMPLE 10

The conditions are identical to those used in Example 2. The solution in this example is made from potassium hydroxide and phosphoric acid to give a mixture of 0.5 molar $KH_2PO_4$ and 0.5 molar $KH_2PO_4$. The results are similar to those obtained in Example 2.

EXAMPLES 11-14

A series of runs are made under conditions identical to those used in Example No. 6 to study the effect on sulfate on absorption efficiency. In each example, the solution is fortified with a certain amount of sulfate. The results are shown in Table 3.

TABLE 3

| Example No. | Sulfate Concentration g/l | % Absorption of $SO_2$ | Liquid Loading $SO_2$ g/l |
|---|---|---|---|
| 11 | 12 | 63 | 3.4 |
| 12 | 30 | 53 | 2.8 |
| 13 | 55 | 50 | 3.1 |
| 14 | 105 | 42 | 2.3 |

It is apparent that the process is still operable at higher sulfate levels, the efficiency of absorption of $SO_2$ decreases with sulfate build-up; however, the change in liquid loading with change in sulfate level between 30 and 105 g. per liter sulfate concentration is small. By adjusting the pH or effective alkali metal:P ratio, or by increasing the ratio of liquid flow to gas flow, the absorption efficiency can be improved. The run in Example 14 is repeated using a liquid flow rate of 390 ml/min. The absorption efficiency increases from 42 to 48%.

EXAMPLES 15-17

To demonstrate the applicability of the process to different $SO_2$ inputs, a series of runs are made where the concentration of $SO_2$ in the feed gas is changed and the absorption efficiency in the column is measured. All conditions employed in Example 4 are the same. The results are given in Table 4.

TABLE 4

| % $SO_2$ in Feed Gas | Absorption Efficiency % |
|---|---|
| 0.29 | 79 |
| 0.68 | 79 |
| 2.20 | 61 |

These data indicate that this sodium phosphate solution could absorb $SO_2$ in tail gases over a wide range of concentration.

EXAMPLE 18

In this example a process is carried out in the following equipment. The absorber is a four inch (inside diameter) glass column containing fifteen feet of ½ inch Berl saddles as the packing. There are three redistributors located at 4 foot intervals.

The reactor has a hold-up volume of six gallons. Agitation is provided by two 4 inch diameter, six blade turbines. The agitators are run at 1160 RPM. Baffles are employed. The reactor is made of Hastelloy C with a 316 stainless steel agitator. The $H_2S$ is fed through a sparger tube. The centrifuge is a Bird six inch solid bowl Super-D-Canter. The feed gas is a cooled incinerated effluent from a Claus process.

The following tables 5-7 illustrate the operating conditions in the absorber, reactor and autoclave.

TABLE 5

ABSORBER OPERATING CONDITIONS

| | High $PO_4^{---}$ Level | Low $PO_4^{---}$ Level |
|---|---|---|
| Running Time Hours | 619 | 45 |
| $PO_4^{---}$ Concentration (mole per liter) | 0.9-1.0 | 0.5-0.6 |
| Na:P Ratio | 1.5:1.0 | 1.5:1.0 |
| Liq. in Temp. °F. | 165-170° | 165-170° |
| Liq. out Temp. °F. | 155-160° | 155-160° |
| Gas in Temp. °F. | 150-155° | 150-155° |
| Gas Out Temp. °F. | 155-160° | 155-160° |
| Gas Rate SCFM | 8.6 | 8.6 |
| Liq. Rate GPM | 0.44 | 0.44 |
| Average Concentration of $SO_2$ in Feed Gas | 1.0% | 1.0% |
| Average Concentration of $SO_2$ in Vent Gas | < 50 ppm | < 50 ppm |
| Superficial Mass Vel. lbs/hr ft² | Gas (G)=350 Liquid (L)=2500 | 350 2500 |
| L/G | 7.15 | |
| $\Delta$ P Across Column inches of $H_2O$ | 8-10 | 8-10 |

TABLE 6

OPERATING CONDITION REACTOR & AUTOCLAVE

| REACTOR: | | |
|---|---|---|
| | Temp. °F. | 145 - 155 |
| | Residence Time, Minutes | 13.5 |
| | $H_2S$ Rate, SCFM | 0.19 - 0.21 |
| | % Excess (at 1.0% $SO_2$ in) | 30 - 40 |
| | $H_2S$ Press., inches of $H_2O$ | 15 - 20 |
| AUTOCLAVE: | | |
| | Temp. °F. | 70 - 275°F. |
| | Heat-up Time Hours | 3 |
| | Feed Slurry Conc., %S | 15 - 50 |
| | Gross Sulfur Make Rate, lbs./hr. | 1.35 |

TABLE 7

SUMMARY OF ANALYTICAL DATA

| Total on stream time | | | | 664 hours |
|---|---|---|---|---|
| $SO_4$ feed, wt | 1.5 | 17 | 27.5* | |
| $S_2O_3$, g/l (as $SO_2$) | 2.5 - 21 | | | |
| $SO_2$, g/l | | | | |
|   Absorber in | 0-0.75 | | | |
|   Absorber out | 3-5.5 | | | |
| pH | | | | |
|   Absorber in | 3.8-4.5 | | | |
|   Absorber out | 3.0-3.5 | | | |
| $PO_4$ Level (Molarity) | | | | |
|   High | 0.9 - 1.0 | | | |
|   Low $PO_4$ | 0.5 - 0.6 | | | |
| Na*/P, molar ratio | 1.5 | | | |
| Polythionates | Absorber In | | Absorber Out | |
|   $S_2O_3$ g/l | 0.33 | | 0.19 | |
|   $S_3O_6$ g/l | 0.44 | | 1.25 | |
|   $S_5O_6$ g/l | 0.18 | | 0.21 | |

*Note: $SO_4$ naturally builds up from 1.5 to about 17. Sodium sulfate is then added to achieve 27.5 g/l to observe whether $SO_2$ could still be absorbed. While $SO_2$ is still absorbed, the absorption efficiency is decreased.

EXAMPLE 19

A sample of a phosphate liquor containing 95 g/l phosphate and 50 g/l sulfate, is cooled in a jacketed cooling chamber where the temperature is maintained by circulating thermostated methanol. The sample is thermally equilibrated for about one hour. The solution is seeded with a very small amount of anhydrous $Na_2SO_4$. Seeding is repeated until crystallization is initiated. At equilibrium, the solution is filtered. The solid and the filtrate are analayzed for sulfate and phosphate. At 35° F. the weight ratio of sulfate to phosphate in the solid was 5.3:1. The filtrate contains 88.3 g/l phosphate and 16 g/l sulfate. Phosphate can be added to get a regenerated absorber solution.

The apparatus of Example 18 was operated at an $SO_4^{--}$ level of 50 grams per liter. A small side stream of absorbent was cooled to 2°–4° C. and the crystals which formed were separated from the liquid. The liquid was circulated back to the absorber. The crystals which were recovered had the following composition:

| | |
|---|---|
| $Na_2SO_4.10H_2O$ | = 88.5% |
| $Na_2HPO_4.12H_2O$ | = 1.5% |
| Chlorides | = <0.05% |
| Polythionates | = <0.05% |
| Moisture | = 10% |
| (1M $PO_4^{---}$ solution) | |

EXAMPLE 20

The apparatus of Example 2 is utilized to determine the effect of absorbent composition on the process of the present invention. A solution of sodium phosphate is prepared and the sodium:P ratio and molarity determined. Seventy-four grams of $Na_2SO_4$ per liter are added to the system. The solution is continuously circulated through the absorber in contact with a gas stream containing 1.22 volume percent $SO_2$ at 140° F. The solution from the absorber is contacted with $H_2S$ at 140° F. After 4 hours the solution entering the absorber and entering the reactor is sampled and analyzed. The results of the tests are shown in the accompanying Table 8.

| Temperature °F. | % $SO_2$ In Gas | $SO_2$ In Liquid g/l |
|---|---|---|
| 95 | 1.12 | 9.93 |
| 127 | 1.12 | 7.40 |
| 165 | 1.12 | 5.10 |
| 176 | 1.12 | 4.84 |
| 140 | 9.2 | 12.7 |

The above data illustrates that the temperature and the concentration of $SO_2$ in the gas stream affects the amount of $SO_2$ which can be transferred to the absorbent.

EXAMPLE 22

The apparatus of Example 2 is utilized to contact 340 milliliters per minute of a 1.0 molar $PO_4^{---}$, 1.5 Na:P ratio solution with 1.91 cubic feet per minute of a 9.2% by volume $SO_2$ containing gas stream at 140° F. After 3 hours of circulation through the process, the absorbent entering the absorber contained 0.4 grams/liter $SO_2$ and the absorbent leaving the absorber contained 10.8 grams per liter $SO_2$. A large portion of the $SO_2$ remained in the gas stream since the amount of absorbent was not sufficient to absorb the amount of $SO_2$ present. However, by suitable design of the column and proper flow of absorbent low levels of $SO_2$ in the gas stream leaving the absorber can be realized.

What is claimed is:

1. A method for recovering sulfur from $SO_2$ containing gases which comprises (a) absorbing $SO_2$ in an absorbent comprising an aqueous solution containing an alkali metal phosphate at a pH between about 4.5 and about 2.5 at a temperature between about room temperature and about 200°F. in an absorption zone, (b) passing the $SO_2$ containing absorbent from said absorption zone, into a reaction zone, (c) introducing gaseous $H_2S$ into said $SO_2$ containing absorbent in said reaction zone in an amount in excess of that required to react the $SO_2$ in said $SO_2$ containing absorbent to sulfur wherein said absorbent is maintained at a pH between about 2.5 and about 5.5 to produce sulfur, (d) separating sulfur from the absorbent and recycling the absorbent to said absorption zone.

2. The method of claim 1 in which the pH in said absorption and reaction zones is maintained between about 2.8 and about 4.5.

TABLE 8

| $PO_4^{---}$ Conc. (MOLAR) | Na/$PO_4^{---}$ (Mole Ratio) | Absorber Feed Analysis | | | | | Reactor Feed Analysis | | | |
|---|---|---|---|---|---|---|---|---|---|---|
| | | $SO_2$ | $S_2O_3^{--}$ | $SxO_6^{--}$ | $SO_4^{--}$ | pH | $SO_2$ | $S_2O_3^{--}$ | $SxO_6^{--}$ | pH |
| | 1.0 | — | — | — | — | — | — | — | — | — |
| | 1.5 | 0.07 | 12.1 | 0.6 | 54.7 | 3.9 | 3.3 | 12.2 | 1.4 | 2.8 |
| 0.5 | 2.0 | 0.5 | 25.3 | 0.6 | 59.5 | 4.2 | 3.7 | 25.1 | 2.5 | 2.9 |
| | 2.5 | 0.13 | 36.4 | 0.5 | 56.6 | 4.4 | 3.8 | 36.0 | 3.5 | 2.9 |
| | 1.0 | — | — | — | — | — | — | — | — | — |
| | 1.5 | 0.16 | 18.7 | 0.5 | — | 4.0 | 4.0 | 18.7 | 1.3 | 3.1 |
| 0.75 | 2.0 | 0.08 | 37.3 | 0.7 | — | — | 4.5 | 36.8 | 3.6 | — |
| | 2.5 | 0.16 | 54.9 | 0.7 | — | 4.3 | 4.5 | 54.2 | 2.2 | 3.0 |
| | 1.0 | 0.02 | 4.1 | 0.7 | — | 3.1 | 2.8 | 4.0 | 0.9 | 2.8 |
| | 1.5 | 0.2 | 24.2 | 0.8 | 56.2 | 4.0 | 4.2 | 24.0 | 1.6 | 3.0 |
| 1.0 | 2.0 | 0.0 | 48.2 | 0.7 | — | 4.2 | 4.6 | 47.3 | 2.0 | 3.3 |
| | 2.5 | 0.2 | 61.4 | 0.4 | 58.1 | 4.2 | 4.5 | 59.8 | 1.9 | 3.0 |
| | 1.0 | — | — | — | — | — | — | — | — | — |
| | 1.5 | 0.06 | 29.8 | 0.9 | — | — | 4.4 | 29.4 | 1.9 | — |
| 1.25 | 2.0 | 0.0 | 59.0 | 0.7 | 58.6 | 3.8 | 4.8 | 58.1 | 1.5 | 3.0 |
| | 2.5 | — | 41.2 | 10.8 | 64.8 | — | — | 41.7 | 14.7 | 3.5 |
| | 1.0 | — | — | — | — | — | — | — | — | — |
| | 1.5 | — | 15.2 | 0.5 | 51.8 | 4.0 | — | 15.7 | 1.9 | 3.2 |
| 1.50 | 2.0 | 0.2 | 34.8 | 0.8 | 51.4 | 3.8 | 4.9 | 34.6 | 2.0 | — |
| | 2.5 | — | 44.7 | 6.4 | 64.3 | — | — | 44.6 | 7.8 | — |

EXAMPLE 21

The equilibrium loading of a phosphate absorbent at different temperature is determined by circulating an absorbent through the absorber of Example 2 without reacting the absorbent with $H_2S$ until the $SO_2$ concentration in the gas stream leaving the absorber is substantially the same as the $SO_2$ concentration in the gas stream entering the absorber. The absorbent is then analyzed for $SO_2$ loading. The absorbent composition is 1.0 molar $PO_4^{---}$ with Na:P ratio 1.5. The absorbent contains 50 grams per liter $SO_4^{--}$. The results of the experiment are as follows:

3. The method of claim 1 in which said absorbent containing alkali metal phosphate has an alkali metal phosphate ratio between about 2.5:1 and 1:1.

4. The method of claim 1 in which said alkali metal phosphate has an alkali metal:phosphate ratio of between about 1.2:1 to about 2:1.

5. The method of claim 1 in which said alkali metal phosphate comprises $Na_2HPO_4$.

6. The method of claim 1 in which said alkali metal phosphate comprises a mixture of $Na_2HPO_4$ and $NaH_2PO_4$.

7. The method of claim 1 in which the phosphate concentration of the solution in said absorption zone is between about 2 and about 0.5 molar.

8. The method of claim 1 in which the temperature in said reaction zone is between about 90° and about 200° F.

9. The method of claim 1 in which said $H_2S$ is fed to said reaction zone at rate to maintain a ratio relative to $SO_2$ between about stoichiometric and about 500% excess over the amount stoichiometrically necessary to react with the $SO_2$ in the absorbent to form sulfur and excess gaseous $H_2S$ is separated and withdrawn from said reaction zone.

10. The method of claim 1 in which a portion of the absorbent separated from sulfur in step (d) is treated for sulfate salt removal in a sulfate removal zone and thereafter recycled to said absorption zone.

11. The method of claim 10 in which said absorbent is cooled to selectively crystallize sulfate salt from said absorbent which is then recycled.

12. The method of claim 1 in which the $SO_2$ containing gas fed to said absorption zone contains between about 0.1 and about 15% $SO_2$ and is substantially free of $H_2S$, COS, $CS_2$ and sulfur vapor.

13. The method of claim 1 in which the $SO_2$ containing gas fed to said absorption zone is incinerated off gas from a Claus-type reactor.

14. The process of claim 1 wherein the absorbent contains between about 0.5 to about 1.25 molar phosphate and an alkali metal:phosphate ratio between 1:1 and about 2.5:1.

* * * * *